Jan. 19, 1937.  H. MALM  2,068,238
FLEXIBLE RUBBER OVERSHOE
Filed Dec. 21, 1935
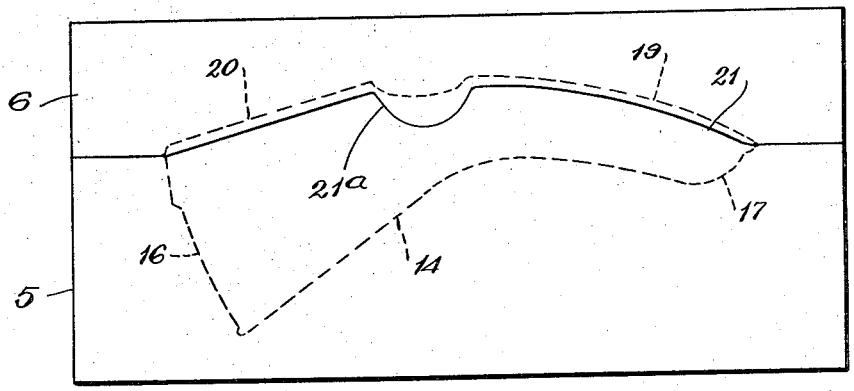
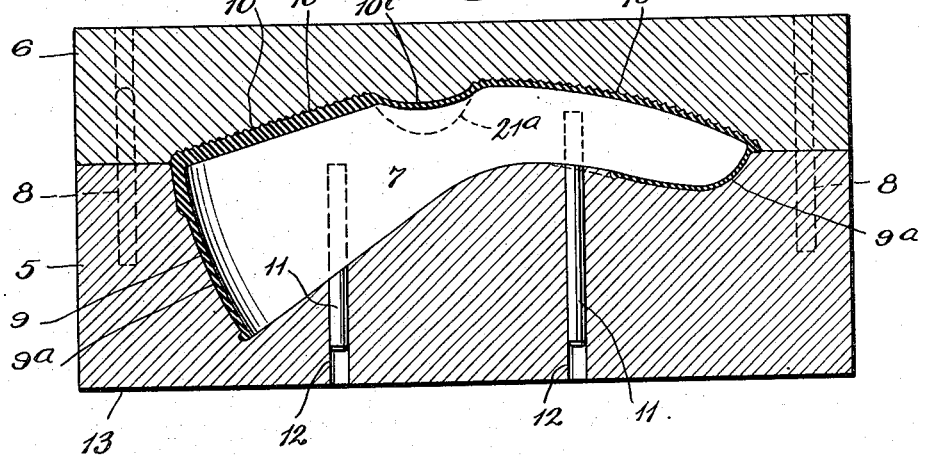
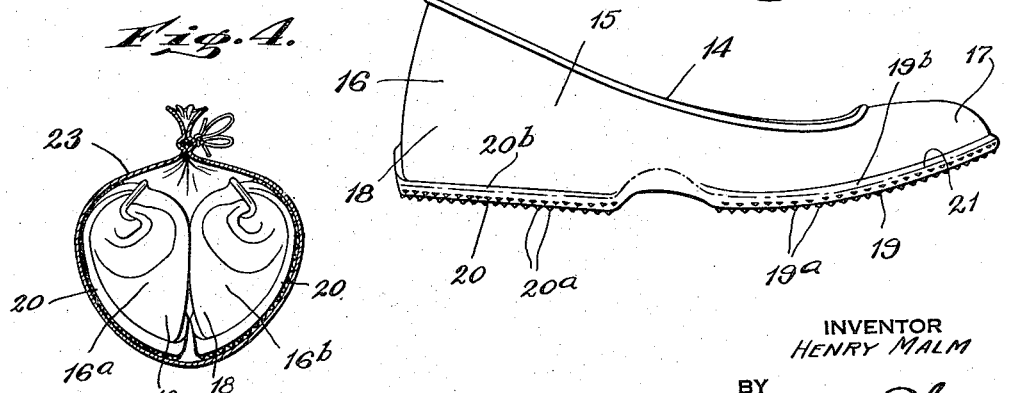
INVENTOR
HENRY MALM
BY
Howard E. Thompson
ATTORNEY Patented Jan. 19, 1937

2,068,238

UNITED STATES PATENT OFFICE 2,068,238

FLEXIBLE RUBBER OVERSHOE

Henry Malm, New York, N. Y.

Application December 21, 1935, Serial No. 55,539

2 Claims. (Cl. 36—7.3)

This invention relates to rubbers employing sole and heel portions and an upper body part for partially enveloping or covering a shoe upper; and the object of the invention is to provide an article of apparel of the class described composed entirely of rubber whereby all portions of the article are capable of expansion and contraction, and further, whereby the article may be folded or rolled into a relatively small compact package facilitating the placement of a pair of rubbers in a pocket of a garment, pocketbook or the like to carry the same when not in use upon the shoes of a wearer; and with these and other objects in view, the invention consists in an article of manufacture of the class described which is produced in accordance with the method more fully hereinafter described.

The invention is fully disclosed in the following specification, of which the accompanying drawing forms a part, in which the separate parts of my improvement are designated by suitable reference characters in each of the views, and in which:

Fig. 1 is a side view of two die or mold parts illustrating the general contour of the parting line of said parts.

Fig. 2 is a longitudinal sectional view through the die or mold parts shown in Fig. 1 and diagrammatically illustrating the method of using the same.

Fig. 3 is a side view of a rubber formed from the dies or molds shown in Figs. 1 and 2; and, Fig. 4 is a sectional view of a container showing a pair of rubbers compactly folded therein.

In Figs. 1 and 2 of the drawing, I have diagrammatically illustrated the separate parts of a mold or die employed for forming my improved rubbers. In said figures, 5 represents the lower die or mold part; 6 the upper part; and 7 the core. Suitable dowel or alining pins 8 will be provided for bringing the cavity 9 of the part 5 and the cavity 10 of the part 6 in proper registering alinement. The core 7 has similar dowel or alinement pins 11 for properly positioning and alining the core within the cavities 9 and 10.

The pins 11 will be preferably attached to the core 7 and enter apertures 12 in the part 5, which apertures open through the lower surface 13 of the part 5 to facilitate the insertion of other pins or tools to act as means for ejecting the core from the part 5 after a rubber has been formed thereon.

In the operation of forming or molding a rubber, sheets, strips or particles of rubber are first placed upon the side walls 9a of the cavity 9, after which the core 7 will be mounted in position, and then a preformed sheet or strip of rubber will be laid upon the core 7, or a number of such strips or sheets, to substantially build up or form about the core 7 the required amount of rubber to be molded into the sole and heel portions of the resulting article, after which the die or mold part 6 is placed in position.

At this time, it will be understood that the surfaces 10a, 10b of the cavity 10 forming the lower surfaces of the sole and heel portion of the resulting article may be engraved or otherwise formed to produce the desired rough contour or tread on the sole and heel portions of the resulting article. The intermediate surface 10c may also have thereon such markings as to apply a trade-mark, name or other advertising or descriptive literature including a designation of size which will appear on the resulting article.

It will be understood that the die parts 5 and 6 will be heated in any desired manner and will be held together under pressure during the vulcanization of the rubber disposed within the cavities 9 and 10 around the core 7. Under this treatment, the rubber or rubber compound employed will form a homogeneous article upon the core 7, and when sufficient time has been allowed to effect complete vulcanization, the upper part 6 of the mold is raised, the core 7 is then removed from the part 5 and the resulting rubber is removed from the core 7, after which the article thus formed is trimmed to remove any flare or excess rubber that may prevail along the parting line defined by the two die or mold parts and around the opening formed in the top of the resulting article. At this time, the article may also be finished by the application of a finishing coating, such for example as a coating of lacquer.

In considering Figs. 1 and 2 of the drawing, it will appear that the core as well as the mold cavities or impressions 9 and 10 are so arranged as to mold the finished article or rubber in a curved contour, that is to say, the back of the heel of the rubber as well as the toe portion of the sole are raised with respect to the central portion of the rubber, the purpose of which is to shorten the upper edges 14 of the side walls 15 of the resulting rubber 16, a side view of which appears in Fig. 3 of the drawing so that when the rubber is mounted upon the shoe of the wearer, the side edges 14 centrally of the rubber and the side walls 15 thereof will fit snugly upon both side surfaces of the shoe. By reason of this manner of molding the rubber, the toe portion 17 and heel portion 18 will fit snugly upon the toe and heel portions of the shoe, especially with respect to the upper and lower surfaces thereof. The sole 19 of the rubber will be considerably thicker than the rubber upper, especially bearing in mind the roughened tread portion 19a thereof, and the heel 20 is preferably made heavier than the sole 19 and also includes a roughened tread 20a. The sole and heel join the upper or side walls 15 in rounded edges 19b and 20b which project slightly beyond the surface of the wall 15.

In Fig. 3 of the drawing, I have indicated at 21 a dot and dash line extending longitudinally of the side edges of the sole and heel 19, 20 and through the arch of the rubber; and this line represents the parting line 21a between the die or mold parts 5 and 6 as is indicated in Fig. 1 of the drawing. This method of forming rubbers will not only simplify the manufacture thereof but will also enhance the appearance of the resulting article by maintaining the trimming line, above referred to as the parting line 21, substantially upon the sole and heel of the rubber. This eliminates the defacing of the upper or side walls 15 of the rubber, as would otherwise be experienced.

By forming articles of apparel of the class described in the manner herein set forth, by reason of the fact that the product is composed entirely of rubber, the same can be produced in relatively few sizes, for example, large, medium and small for men sizes and the same for women, and large, medium and small for the children sizes. In addition to the extensibility of the upper structure of the rubber, the sole and heel of the rubber are also capable of extension to fit different sizes as well as different contours of a shoe.

Rubbers produced in the manner described will be comparatively light in weight and may be compactly rolled or folded together as indicated at 16a, 16b, Fig. 4 of the drawing, and placed in a suitable container, pouch or wrapper 23 in said figure. This container 23 is preferably composed of rubber or of waterproof material so that a pair of wet rubbers may be placed in the container 23 and then placed in a pocket of a garment, pocketbook or handbag for storage when not in use.

From the foregoing, it will appear that my improved article of manufacture will encourage the removal of rubbers from the feet of the wearer on the many occasions where rubbers have otherwise been worn indoors where the protection is not required, causing discomfort to the wearer. This encouragement is primarily due to the fact that a pair of rubbers may be folded or rolled into a very compact and non-bulky package.

My invention is not limited to the particular form and contour of the rubber herein shown and described which is primarily a children's or man's rubber, as the same may be applied to rubbers for women and furthermore, the styles and contour of the respective rubbers may be changed to suit the fancy or desires of a manufacturer.

Having fully described my invention, what I claim as new and desire to secure by Letters Patent, is:

1. In footwear, a rubber for mounting upon the shoe of a wearer, said rubber comprising a unitary molded body composed only of freely flexing relatively highly extensible rubber throughout, said rubber body consisting of a normally relatively flat bottom having thick sole and heel portions and a thinner shank and upper part, said upper part being continuous with and extending entirely around the peripheral edge of the rubber bottom and forming an upper shoe engaging portion, the outer peripheral edge of the sole and heel portions of the rubber bottom extending beyond said upper part, and said relatively high extensibility of the rubber adapting the same to shoes having a range in many sizes and contours.

2. In footwear, a rubber for mounting upon the shoe of a wearer, said rubber comprising a unitary molded body composed throughout of freely flexing rubber, said rubber body consisting of a normally relatively flat bottom having thick sole and heel portions and a thinner shank and upper part, all of relatively highly extensible rubber throughout, said upper part being continuous with and extending entirely around the peripheral edges of the rubber bottom and forming an upper shoe engaging portion, the outer peripheral edges of the sole and heel portions of the rubber bottom extending beyond said upper part, said relatively high extensibility of the rubber adapting the same to shoes having a wide range in size and contour, and the side walls of the upper shoe engaging part of the rubber being sufficiently short in length relatively to the length of the bottom so that when not in use the ends of the heel and toe portions of the rubber bottom are supported by side walls in an upwardly extended position with respect to the normal floor engaging portions of the sole and heel.

HENRY MALM.